United States Patent
Bogner et al.

(10) Patent No.: US 9,546,569 B2
(45) Date of Patent: Jan. 17, 2017

(54) TURBOCHARGER WITH COOLED TURBINE HOUSING, COOLED BEARING HOUSING, AND A COMMON COOLANT SUPPLY

(75) Inventors: Mathias Bogner, Neutraubling (DE); Marc Hiller, Morschheim (DE); Ralph-Maurice Koempel, Mannheim (DE)

(73) Assignee: Continental Automotive GmbH, Hannover (DE)

( * ) Notice: Subject to any disclaimer, the term of this patent is extended or adjusted under 35 U.S.C. 154(b) by 645 days.

(21) Appl. No.: 13/984,896

(22) PCT Filed: Feb. 8, 2012

(86) PCT No.: PCT/EP2012/052119
§ 371 (c)(1),
(2), (4) Date: Aug. 12, 2013

(87) PCT Pub. No.: WO2012/107483
PCT Pub. Date: Aug. 16, 2012

(65) Prior Publication Data
US 2013/0323022 A1  Dec. 5, 2013

(30) Foreign Application Priority Data

Feb. 10, 2011  (DE) .................. 10 2011 003 905

(51) Int. Cl.
*F02B 39/00*  (2006.01)
*F04D 29/58*  (2006.01)
(Continued)

(52) U.S. Cl.
CPC .............. *F01D 25/14* (2013.01); *F02C 6/12* (2013.01); *F04D 29/4206* (2013.01);
(Continued)

(58) Field of Classification Search
CPC ......... F25B 41/00; F25B 41/067; F25B 47/02; F25B 5/00; F25B 2341/0012; F25B 2600/2501; F25B 2400/0403; F25B 2600/2513; F25B 2700/21173
(Continued)

(56) References Cited

U.S. PATENT DOCUMENTS

| 8,459,024 B2 | 6/2013 | Koch |
| 2004/0083730 A1 | 5/2004 | Wizgall et al. |

(Continued)

FOREIGN PATENT DOCUMENTS

| DE | 10235189 A1 | 2/2004 |
| DE | 102008011258 A1 | 9/2009 |

(Continued)

OTHER PUBLICATIONS

Machine Translation DE 10 2009 028 632 Done Feb. 4, 2016.*

*Primary Examiner* — Audrey K Bradley
*Assistant Examiner* — Dapinder Singh
(74) *Attorney, Agent, or Firm* — Laurence A. Greenberg; Werner H. Stemer; Ralph E. Locher

(57) ABSTRACT

A turbocharger has a turbine housing and a bearing housing that is connected to the turbine housing. The turbine housing is formed with a coolant inlet, a cooling jacket in the interior of the turbine housing, and a coolant outlet. The bearing housing has a coolant inlet, a cooling jacket in the interior of the bearing housing, and a coolant outlet. The coolant inlet of the bearing housing is connected to a branched coolant outlet of the turbine housing. The coolant outlet of the bearing housing is connected to a coolant return inlet of the turbine housing.

11 Claims, 3 Drawing Sheets

(51) Int. Cl.
    *F01D 25/14*     (2006.01)
    *F02C 6/12*     (2006.01)
    *F04D 29/42*     (2006.01)

(52) U.S. Cl.
    CPC .......... *F04D 29/584* (2013.01); *F02B 39/005* (2013.01); *F05D 2260/232* (2013.01)

(58) Field of Classification Search
    USPC ..... 415/110, 116, 145, 170.1, 180, 200, 205
    See application file for complete search history.

(56) References Cited

U.S. PATENT DOCUMENTS

| | | | |
|---|---|---|---|
| 2004/0200215 A1* | 10/2004 | Woollenweber | F01D 15/10 60/407 |
| 2011/0008158 A1 | 1/2011 | Boening et al. | |
| 2012/0003075 A1* | 1/2012 | Niwa | F01D 25/18 415/111 |
| 2012/0093631 A1* | 4/2012 | Joergl | F01D 9/026 415/145 |

FOREIGN PATENT DOCUMENTS

| | | |
|---|---|---|
| DE | 102009028632 A1 | 3/2011 |
| EP | 1384857 A2 | 1/2004 |
| FR | 2925116 A3 | 6/2009 |
| WO | 2009019153 A2 | 2/2009 |
| WO | 2010009945 A2 | 1/2010 |

\* cited by examiner

FIG 3
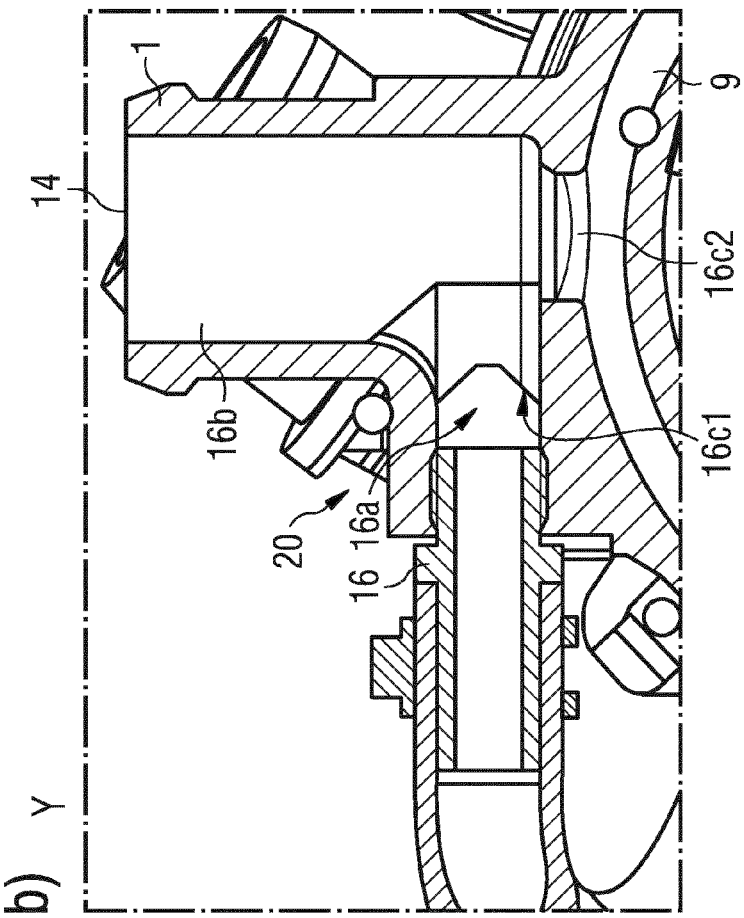
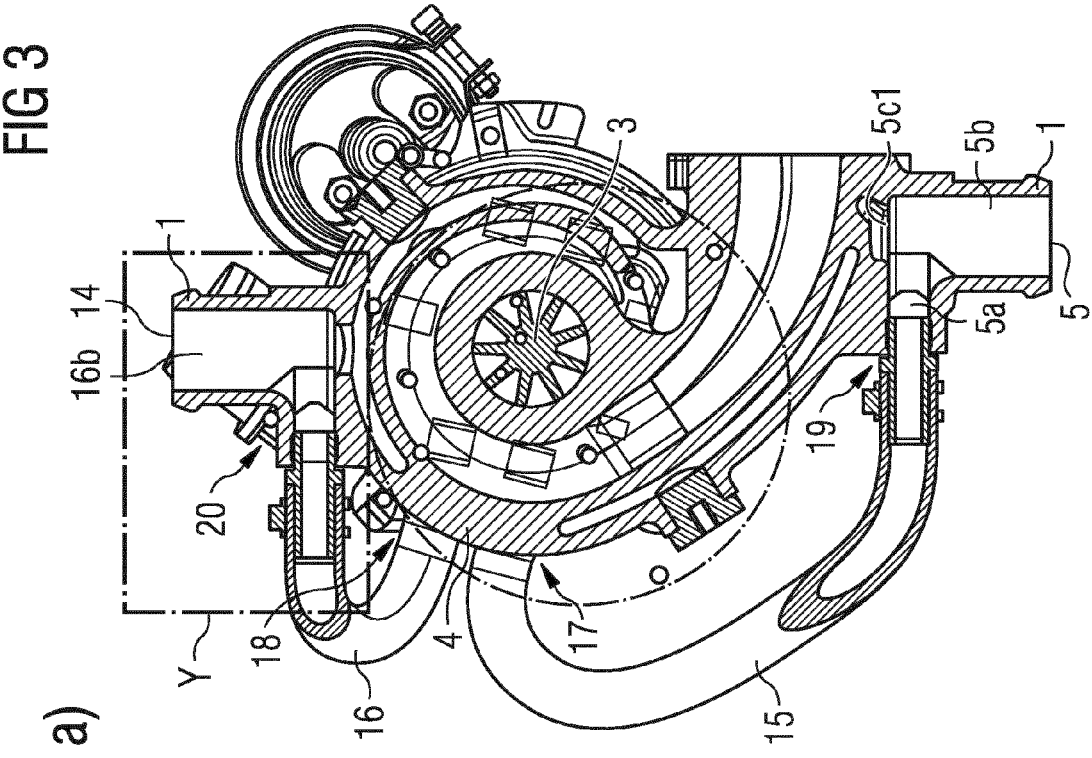

TURBOCHARGER WITH COOLED TURBINE HOUSING, COOLED BEARING HOUSING, AND A COMMON COOLANT SUPPLY

BACKGROUND OF THE INVENTION

Field of the Invention

The invention relates to an exhaust-gas turbocharger which has a cooled turbine housing.

Exhaust-gas turbochargers serve for improving the efficiency of an internal combustion engine and thus increasing the power thereof. For this purpose, the exhaust-gas turbocharger has a turbine with a turbine wheel and has a compressor with a compressor wheel, wherein the two rotor wheels are arranged on a common shaft. Here, the turbine wheel is driven by an exhaust-gas mass flow from a connected internal combustion engine, and in turn drives the compressor wheel. The compressor compresses inducted fresh air and conducts said fresh air to the internal combustion engine. The common shaft is mounted in a bearing housing of the turbocharger. Furthermore, the turbine wheel of the turbine is arranged in a turbine housing, and the compressor wheel of the compressor is arranged in a compressor housing.

An exhaust-gas turbocharger of said type must satisfy a wide variety of requirements during operation on the internal combustion engine or on an engine connected thereto. One of said requirements consists in accommodating the high temperatures which can arise in the turbocharger housing for example owing to the hot exhaust-gas mass flow.

Here, the conventional construction of an exhaust-gas turbocharger provides individual housings which are composed in each case of a material suited to the temperature prevailing there. Here, the compressor housing is normally composed of aluminum, whereas the bearing housing is normally composed of cast iron. The turbine housing is generally composed, owing to the high temperatures that prevail in said region, of high-temperature-resistant nickel alloys. Owing to the different, suited materials for the individual housings, said housings are formed as separate parts which are connected to one another and which must furthermore be sealed off with respect to one another.

Both the bearing housing and also the turbine housing may be of water-cooled design, wherein the cooling circuits of the bearing housing and turbine housing are realized independently of one another. Consequently, it is necessary for the bearing housing and the turbine housing to be supplied with cooling water via separate lines. Here, in each case one water feed line and in each case one water discharge line is required.

BRIEF SUMMARY OF THE INVENTION

It is the object of the invention to specify an exhaust-gas turbocharger with improved cooling.

Said object is achieved by means of an exhaust-gas turbocharger having the features as claimed. Advantageous embodiments and refinements of the invention are specified in the dependent claims.

According to the present invention, an exhaust-gas turbocharger has a turbine housing and a bearing housing connected to the turbine housing, wherein the turbine housing has a coolant inlet, a cooling jacket provided in the interior of the turbine housing, and a coolant outlet, the bearing housing has a coolant inlet, a cooling jacket provided in the interior of the bearing housing, and a coolant outlet, the coolant inlet of the bearing housing is connected to a coolant branch outlet of the turbine housing, and the coolant outlet of the bearing housing is connected to a coolant return inlet of the turbine housing.

The advantages of an exhaust-gas turbocharger of said type consist in that it requires fewer components and less installation space than known exhaust-gas turbochargers and which can therefore be of more compact construction than known exhaust-gas turbochargers. In particular, it requires only one coolant supply line between the coolant source, which is preferably the cooling circuit of the internal combustion engine, and the exhaust-gas turbocharger, and also only one coolant return line to the cooling circuit of the internal combustion engine.

Further advantageous characteristics of the invention will emerge from the explanation thereof below on the basis of the figures, in which:

BRIEF DESCRIPTION OF THE SEVERAL VIEWS OF THE DRAWING

FIG. 3 shows more detailed illustrations showing the coolant outlet region of the turbine housing.

DESCRIPTION OF THE INVENTION

Figure 1:
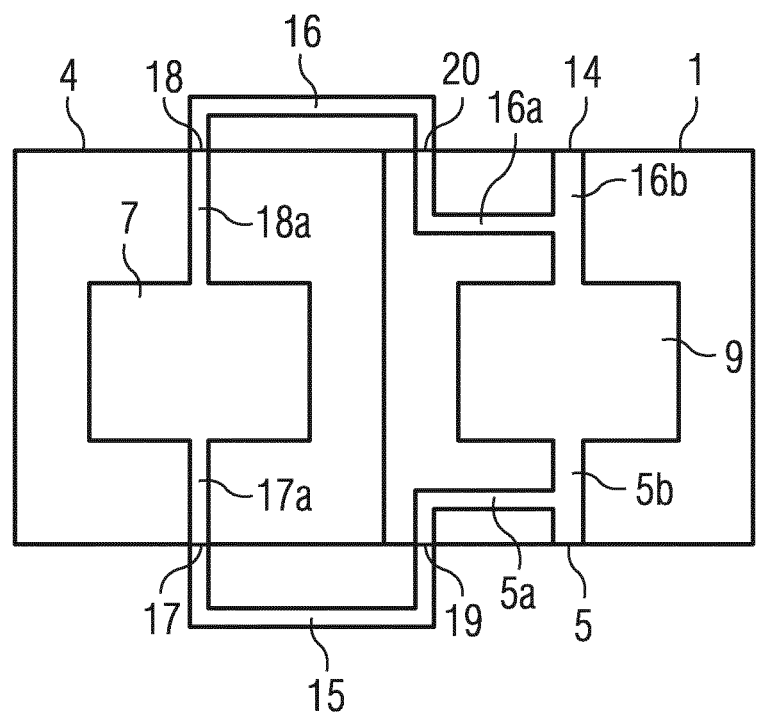
FIG. 1 is a sketch for the basic explanation of the cooling system of an exhaust-gas turbocharger according to the invention.

FIG. 1 is a sketch for the basic explanation of the cooling system of an exhaust-gas turbocharger according to the invention.

An exhaust-gas turbocharger according the invention has a turbine housing 1 and a bearing housing 4 connected to the turbine housing. The turbine housing 1 has a coolant inlet 5 through which cooling water is supplied to the turbine housing during the operation of the exhaust-gas turbocharger. Said cooling water is provided for example from the cooling system of the internal combustion engine.

Furthermore, the turbine housing 1 has a coolant outlet 14 through which cooling water is discharged during the operation of the exhaust-gas turbocharger. Said cooling water which is discharged from the turbine housing is for example returned to the cooling system of the internal combustion engine.

Furthermore, a cooling jacket 9 is provided in the interior of the turbine housing 1, within which cooling jacket coolant is transported during the operation of the exhaust-gas turbocharger in order to provide adequate cooling of constituent parts of the turbine housing, in particular the wastegate flap seat and the turbine spiral.

The coolant inlet 5 is connected to the cooling jacket 9 via a coolant inlet duct 5*b*. The coolant outlet 14 is connected to the cooling jacket 9 via a coolant outlet duct 16*b*.

A turbine-housing-side coolant branch duct 5*a* branches off from the coolant inlet duct 5*b* provided between the coolant inlet 5 and the coolant jacket 9. Said coolant branch duct extends to a coolant branch outlet 19 of the turbine housing. A connecting hose 15 is provided between the coolant branch outlet 19 of the turbine housing and a coolant inlet 17 of the bearing housing 4.

A turbine-housing-side coolant return duct 16*a* opens into the coolant outlet duct 16*b*, the other end portion of which coolant return duct is connected to a coolant return inlet 20 of the turbine housing. The coolant return inlet 20 of the turbine housing is connected via a connecting hose 16 to a coolant outlet 18 of the bearing housing.

The coolant inlet 17 of the bearing housing 4 is connected, within the bearing housing, to the cooling jacket 7 of the bearing housing via a bearing-housing-side coolant inlet duct 17a. During operation of the exhaust-gas turbocharger, coolant is transported through said cooling jacket 7 in order to provide adequate cooling of constituent parts of the bearing housing, in particular bearing elements and sealing elements.

The cooling jacket 7 of the bearing housing 4 is connected to the coolant outlet 18 of the bearing housing via a bearing-housing-side coolant outlet duct 18a.

Consequently, during operation of the exhaust-gas turbocharger, coolant is received via the coolant inlet 5 of the turbine housing 1. Said coolant is divided, within the turbine housing, into a first coolant stream which is used for cooling components of the turbine housing, and a second coolant stream. Said second coolant stream is supplied via the turbine-housing-side coolant branch duct 5a and via the connecting hose 15 to the coolant inlet 17 of the bearing housing 4, enters there into the bearing-housing-side coolant inlet duct 17a, is conducted through the latter to the cooling jacket 7 of the bearing housing, and is used there for cooling components of the bearing housing. The second coolant stream which exits the cooling jacket 7 of the bearing housing is conducted via the bearing-housing-side coolant outlet duct 18a to the coolant outlet 18 of the bearing housing, and is returned from there to the coolant return inlet 20 of the turbine housing via a connecting hose 16. There, the returned coolant enters into the turbine-housing-side coolant return duct 16a. Finally, within the turbine housing, in the region of the coolant outlet duct 16b, the first coolant stream exiting the cooling jacket 9 of the turbine housing and the second coolant stream returned from the bearing housing via the coolant return duct 16a are merged again. The merged coolant stream is discharged through the coolant outlet 14 of the turbine housing and is returned to the cooling system of the internal combustion engine.

That having been said, in the exemplary embodiment described above, the supply and discharge of coolant to and from the bearing housing takes place not via the lines of the bearing housing which are connected directly to the cooling system of the internal combustion engine, but rather via the turbine housing. For this purpose, the turbine housing is connected to the bearing housing via connecting hoses. Coolant for the bearing housing is branched off within the turbine housing. Within the turbine housing, the coolant returned from the bearing housing is merged again with the coolant discharged from the cooling jacket of the turbine housing.

The said branching of the coolant preferably takes place directly upstream of the cooling jacket 9 of the turbine housing, and the said merging of the coolant preferably takes place directly downstream of the cooling jacket.

One advantage of the above-described embodiment of the cooling system of an exhaust-gas turbocharger consists in that the cross sections of the feed lines and return lines for the coolant can be configured as defined throttle cross sections, as will be explained below on the basis of FIGS. 2 and 3. Said configuration is advantageously carried out such that coolant build-up effects in the turbine housing are avoided, and such that the pressure conditions of the coolant are set such that a defined coolant volume stream is branched off.

If the coolant branch is positioned within the region of the cooling jacket 9 of the turbine housing, in particular in the region of the cooling jacket of the turbine wheel, the changing flow conditions would result in an undefined coolant branch flow to the bearing housing.

Figure 2:
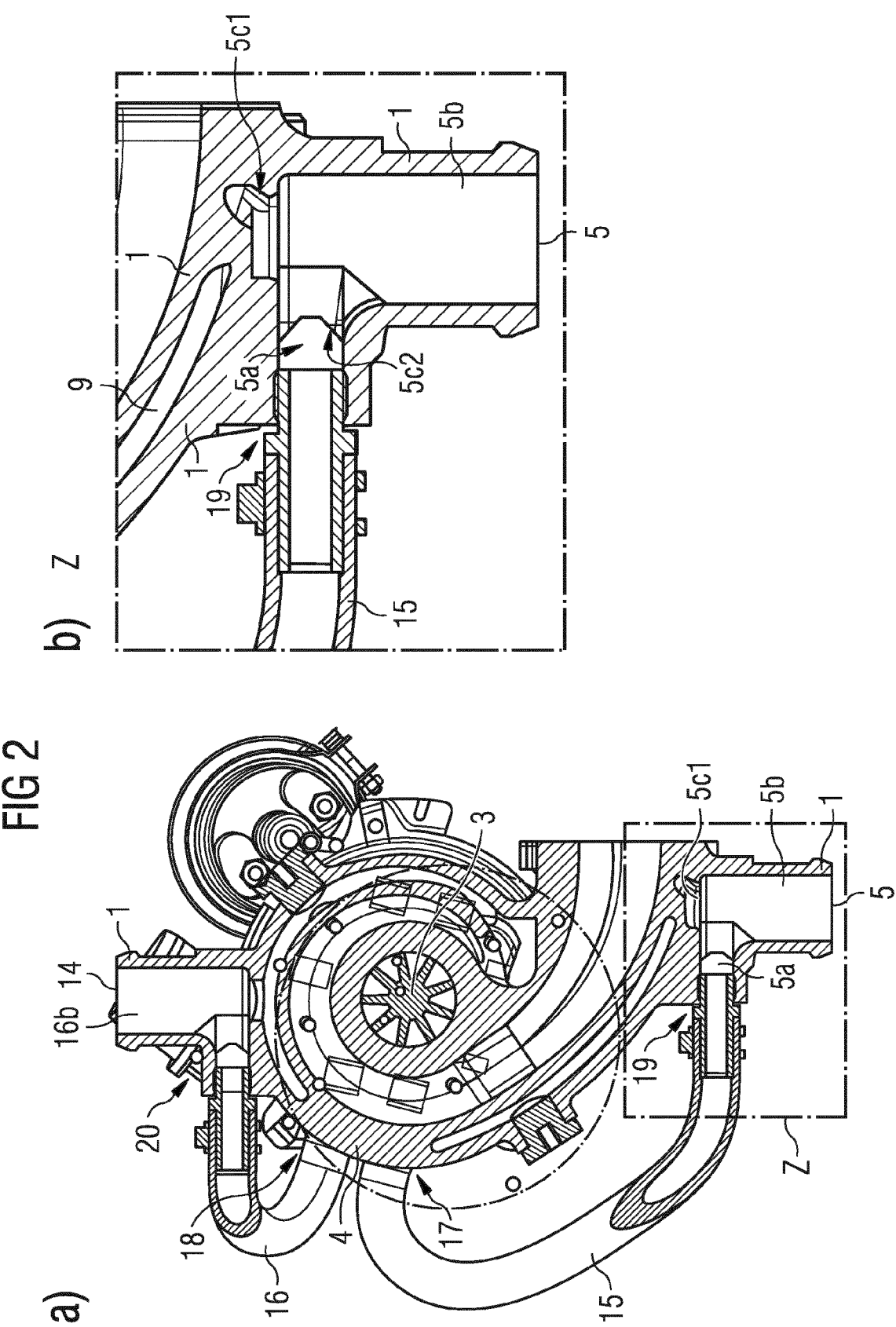
FIG. 2 shows more detailed illustrations showing the coolant inlet region of the turbine housing.

FIG. 2 shows more detailed illustrations showing the coolant inlet region of the turbine housing.

In this connection, FIG. 2a firstly shows a side view of an exhaust-gas turbocharger. Said exhaust-gas turbocharger has a turbine housing 1 and a bearing housing 4. The coolant inlet region of the turbine housing is situated in the lower part of the turbine housing, and is denoted there as a detail Z. Said detail Z includes inter alia a subregion of the turbine housing 1, the coolant inlet 5 of the turbine housing, the coolant inlet duct 5b of the turbine housing, the coolant branch duct 5a of the turbine housing, a throttle cross section 5c1, which is arranged in the coolant inlet duct 5a in the region between the branching point of the coolant branch duct and the cooling jacket of the turbine housing, and the coolant branch outlet 19 of the turbine housing.

The coolant outlet region of the turbine housing is situated in the upper part of the turbine housing and comprises inter alia a subregion of the turbine housing 1, the coolant outlet duct 16b of the turbine housing and the coolant outlet 14 of the turbine housing.

Furthermore, it can be seen from FIG. 2a that the coolant branch outlet 19 of the turbine housing is connected via a connecting hose 15 to the coolant inlet 17 of the bearing housing 4. During operation of the exhaust-gas turbocharger, coolant branched off in the turbine housing is supplied to the bearing housing via said connecting hose 15.

Furthermore, it emerges from FIG. 2a that the coolant outlet 18 of the bearing housing 4 is connected via a connecting hose 16 to a coolant return inlet 20 of the turbine housing. During operation of the exhaust-gas turbocharger, coolant which has been used in the bearing housing is returned to the turbine housing via said connecting hose 16.

FIG. 2b shows an enlarged illustration of the detail Z shown in FIG. 2a. Said FIG. 2b shows in particular the throttle cross sections 5c1 and 5c2. The throttle cross section 5c2 is situated in the coolant branch duct 5a. The throttle cross section 5c1 is provided in the coolant inlet duct 5b in the region between the branching point of the coolant branch duct 5a and the cooling jacket 9 of the turbine housing. Said throttle cross sections are set such that the pressure conditions of the inflowing coolant prevent the generation of a build-up effect, and such that a defined coolant volume flow is branched off.

FIG. 3 shows more detailed illustrations showing the coolant outlet region of the turbine housing.

In this connection, FIG. 3a firstly shows a side view of an exhaust-gas turbocharger. Said exhaust-gas turbocharger has a turbine housing 1 and a bearing housing 4. The coolant inlet region of the turbine housing is situated in the lower part of the turbine housing. Said coolant inlet region includes inter alia a subregion of the turbine housing 1, the coolant inlet 5 of the turbine housing, the coolant inlet duct 5b of the turbine housing, the coolant branch duct 5a of the turbine housing, a throttle cross section 5c1, which is arranged in the coolant inlet duct 5a in the region between the branching point of the coolant branch duct and the cooling jacket of the turbine housing, and the coolant branch outlet 19 of the turbine housing.

The coolant outlet region of the turbine housing is situated in the upper part of the turbine housing and is denoted there as a detail Z. Said detail Z includes inter alia a subregion of the turbine housing 1, the coolant outlet duct 16b of the turbine housing, the coolant return inlet 20 of the turbine housing, the coolant return duct 16*a* of the turbine housing, and the coolant outlet 14 of the turbine housing.

Furthermore, it can be seen from FIG. 3*a* that the coolant branch outlet 19 of the turbine housing is connected via a connecting hose 15 to the coolant inlet 17 of the bearing housing 4. During operation of the exhaust-gas turbocharger, coolant branched off in the turbine housing is supplied to the bearing housing via said connecting hose 15.

Furthermore, it emerges from FIG. 3*a* that the coolant outlet 18 of the bearing housing 4 is connected via a connecting hose 16 to a coolant return inlet 20 of the turbine housing. During operation of the exhaust-gas turbocharger, coolant which has been used in the bearing housing is returned to the turbine housing via said connecting hose 16.

FIG. 3*b* shows an enlarged illustration of the detail Z shown in FIG. 3*a*. Said FIG. 3*b* shows in particular the throttle cross sections 16*c*1 and 16*c*2. The throttle cross section 16*c*1 is situated in the coolant return duct 16*a* of the turbine housing. The throttle cross section 16*c*2 is provided in the coolant outlet duct 16*b* in the region between the cooling jacket 9 and the opening-in point of the coolant return duct 16*a*. Said throttle cross sections are set such that the pressure conditions of the return flow of coolant prevent the generation of a build-up effect.

The invention claimed is:

1. An exhaust-gas turbocharger, comprising:
   a turbine housing formed with a coolant inlet, a cooling jacket inside said turbine housing, and a coolant outlet;
   a bearing housing connected to the turbine housing and being formed with a coolant inlet, a cooling jacket inside said bearing housing, and a coolant outlet;
   said turbine housing having a coolant branch outlet, said coolant inlet of said bearing housing being connected to communicate with said coolant branch outlet; and
   said turbine housing having a coolant return inlet, said coolant outlet of said bearing housing being connected to communicate with said coolant return inlet.

2. The exhaust-gas turbocharger according to claim 1, which comprises a hose connecting said coolant inlet of said bearing housing to said coolant branch outlet of said turbine housing.

3. The exhaust-gas turbocharger according to claim 1, which comprises a hose connecting said coolant outlet of said bearing housing to said coolant return inlet of said turbine housing.

4. The exhaust-gas turbocharger according to claim 1, wherein:
   said turbine housing is formed with a coolant outlet duct extending within said turbine housing between said cooling jacket and said coolant outlet of said turbine housing; and
   a coolant return duct is formed to open into said coolant outlet duct and having an opposite end region connected to communicate with said coolant return inlet.

5. The exhaust-gas turbocharger according to claim 1, wherein:
   said turbine housing is formed with a coolant inlet duct extending within said turbine housing between said coolant inlet and said cooling jacket of said turbine housing; and
   a coolant branch duct branches off from said coolant inlet duct, said coolant branch duct being connected to communicate with said coolant branch outlet of said turbine housing.

6. The exhaust-gas turbocharger according to claim 5, which comprises a throttle cross section formed in said coolant branch duct.

7. The exhaust-gas turbocharger according to claim 5, which comprises a throttle cross section formed in said coolant inlet duct in a region between a branching point of said coolant branch duct and said cooling jacket of said turbine housing.

8. The exhaust-gas turbocharger according to claim 5, which comprises a throttle cross section formed in said coolant branch duct and a further throttle cross section formed in said coolant inlet duct in a region between a branching point of said coolant branch duct and said cooling jacket of said turbine housing.

9. The exhaust-gas turbocharger according to claim 8, which comprises a throttle cross section formed in said coolant return duct.

10. The exhaust-gas turbocharger according to claim 8, which comprises a throttle cross section formed in said coolant outlet duct of said turbine housing between said cooling jacket of said turbine housing and a location at which said coolant return duct issues into said coolant outlet duct of said turbine housing.

11. The exhaust-gas turbocharger according to claim 8, which comprises a throttle cross section formed in said coolant return duct and a further throttle cross section formed in said coolant outlet duct of said turbine housing between said cooling jacket of said turbine housing and a location at which said coolant return duct issues into said coolant outlet duct of said turbine housing.

* * * * *